US012060484B2

(12) United States Patent
Johnson et al.

(10) Patent No.: US 12,060,484 B2
(45) Date of Patent: Aug. 13, 2024

(54) BIOBASED MATERIAL FOR CONSUMER GOODS PACKAGING

(71) Applicant: Danimer IPCo, LLC, Bainbridge, GA (US)

(72) Inventors: Adam Johnson, Bainbridge, GA (US); Satyabrata Samanta, Bainbridge, GA (US)

(73) Assignee: Danimer IPCo, LLC, Bainbridge, GA (US)

( * ) Notice: Subject to any disclaimer, the term of this patent is extended or adjusted under 35 U.S.C. 154(b) by 172 days.

(21) Appl. No.: 17/385,120

(22) Filed: Jul. 26, 2021

(65) Prior Publication Data

US 2022/0033649 A1 Feb. 3, 2022

Related U.S. Application Data

(60) Provisional application No. 63/058,563, filed on Jul. 30, 2020.

(51) Int. Cl.
| | |
|---|---|
| C08L 67/04 | (2006.01) |
| B65D 65/46 | (2006.01) |
| C08L 1/10 | (2006.01) |
| C08L 1/12 | (2006.01) |
| C08L 1/14 | (2006.01) |
| C08L 67/02 | (2006.01) |

(52) U.S. Cl.
CPC ............ *C08L 67/04* (2013.01); *B65D 65/466* (2013.01); *C08L 1/10* (2013.01); *C08L 67/02* (2013.01); *C08L 1/12* (2013.01); *C08L 1/14* (2013.01); *C08L 2201/06* (2013.01); *C08L 2203/30* (2013.01); *C08L 2205/025* (2013.01); *C08L 2205/03* (2013.01); *C08L 2205/06* (2013.01); *C08L 2205/24* (2013.01)

(58) Field of Classification Search
CPC ... B65D 65/466; C08L 2201/06; C08L 67/04; C08L 1/10–14
See application file for complete search history.

(56) References Cited

U.S. PATENT DOCUMENTS

| | | | |
|---|---|---|---|
| 5,292,860 A | 3/1994 | Shiotani et al. | |
| 5,602,227 A | 2/1997 | Noda | |
| 5,618,555 A | 4/1997 | Tokuda et al. | |
| 5,650,555 A | 7/1997 | Somerville et al. | |
| 5,821,299 A | 10/1998 | Noda | |
| 5,849,854 A | 12/1998 | Noda | |
| 5,883,199 A | 3/1999 | McCarthy et al. | |
| 5,899,339 A | 5/1999 | Noda | |
| 5,918,747 A | 7/1999 | Noda | |
| 5,942,597 A | 8/1999 | Noda et al. | |
| RE36,548 E | 2/2000 | Noda | |
| 6,077,931 A | 6/2000 | Noda | |
| 6,111,004 A | 8/2000 | Biesiada et al. | |
| 6,828,074 B2 | 12/2004 | Yano et al. | |
| 7,811,352 B2 | 10/2010 | Binder et al. | |
| 8,519,053 B2 | 8/2013 | Tian et al. | |
| 8,822,584 B2 | 9/2014 | Whitehouse | |
| 8,937,135 B2 | 1/2015 | Steinke et al. | |
| 9,206,311 B2 | 12/2015 | Steinke et al. | |
| 9,328,239 B2 | 5/2016 | Krishnaswamy | |
| 9,353,258 B2 | 5/2016 | Krishnaswamy et al. | |
| 9,650,513 B2 | 5/2017 | Krishnaswamy et al. | |
| 10,113,060 B2 | 10/2018 | Krishnaswamy et al. | |
| 10,351,665 B2 | 7/2019 | Arnold et al. | |
| 10,457,782 B2 | 10/2019 | Johnson et al. | |
| 2002/0052445 A1 | 5/2002 | Terada et al. | |
| 2003/0166748 A1 | 9/2003 | Khemani et al. | |
| 2003/0217648 A1 | 11/2003 | Noda et al. | |
| 2005/0154114 A1 | 7/2005 | Hale | |
| 2006/0058498 A1 | 3/2006 | Satkowski et al. | |
| 2008/0281018 A1 | 11/2008 | Seeliger et al. | |
| 2009/0023836 A1* | 1/2009 | Nascimento | C08L 67/04 523/124 |
| 2012/0108743 A1 | 5/2012 | Krishnaswamy et al. | |
| 2014/0235771 A1 | 8/2014 | Suwa et al. | |

(Continued)

FOREIGN PATENT DOCUMENTS

| | | |
|---|---|---|
| EP | 1436350 A1 | 7/2004 |
| EP | 1027384 B1 | 7/2005 |

(Continued)

OTHER PUBLICATIONS

Machine translation of JP-2007302776-A from patentscope (Year: 2007).*
Ahn, B.D., et al., Synthesis and Characterization of the Biodegradable Copolymers from Succinic Acid and Adipic Acid with 1,4-Butanediol, Journal of Applied Polymer Science, col. 82, 2001, pp. 2808-2826.
Bhubalan, Kesaen, et al., Controlled biosynthesis and characterization of poly(3-hydroxybutyrate-co-3-hydroxyvalerate-co-3-hydroxyhexanoate) from mixtures of palm kernel oil and 3HV-precursors, Polymer Degradation and Stability, vol. 93, 2008, pp. 17-23.
Bhubalan, Kesaven, et al., Improved synthesis of P(3HB-co-3HV-co-3HHX) terpolymers by mutant Cupriavidus nectar using the PHA synthase gene of *Chromobacterium* sp. USM2 with high affinity towards 3HV, Polymer Degradation and Stability, vol. 95, 2020, pp. 1436-1442.

(Continued)

*Primary Examiner* — Kregg T Brooks
*Assistant Examiner* — David R. Foss
(74) *Attorney, Agent, or Firm* — Luedeka Neely, P.C.

(57) ABSTRACT

A biodegradable polymeric composition for food contact applications is disclosed. This polymeric composition includes at least (1) from about 5 weight percent to about 95 weight percent poly(hydroxyalkanoates); (2) from about 5 weight percent to about 95 weight percent of at least one biodegradable polymer selected from the group consisting of poly(butylene succinate), poly(butylene succinate-co-adipate), poly(butylene adipate-co-terephthalate, poly(caprolactone), poly(lactic acid), cellulose esters (such as cellulose acetate) thermoplastic starch, and mixtures thereof; and (3) from about 0.1 weight percent to about 5 weight percent of a nucleating agent.

18 Claims, No Drawings

(56) References Cited

U.S. PATENT DOCUMENTS

| | | |
|---|---|---|
| 2015/0094416 A1 | 4/2015 | Steinke et al. |
| 2015/0203674 A1 | 7/2015 | Weinlein et al. |
| 2015/0210801 A1 | 7/2015 | Abe et al. |
| 2016/0053111 A1 | 2/2016 | Krishnaswamy et al. |
| 2016/0096917 A1 | 4/2016 | Li et al. |
| 2016/0108233 A1 | 4/2016 | Kann et al. |
| 2017/0087658 A1 | 3/2017 | Townsend |
| 2017/0181427 A1 | 6/2017 | Shani et al. |
| 2017/0342261 A1 | 11/2017 | Schmidt et al. |
| 2018/0334564 A1 | 11/2018 | Andrews et al. |
| 2020/0367490 A1 | 11/2020 | Trump et al. |
| 2020/0369872 A1 | 11/2020 | Trump et al. |
| 2020/0369909 A1 | 11/2020 | Grubbs, III et al. |

FOREIGN PATENT DOCUMENTS

| | | |
|---|---|---|
| EP | 2285901 A1 | 2/2011 |
| EP | 2202267 B1 | 12/2011 |
| EP | 2736973 B1 | 9/2015 |
| EP | 1566409 B1 | 6/2016 |
| EP | 2881435 B1 | 1/2017 |
| EP | 3360927 A1 | 8/2018 |
| EP | 3424990 B1 | 5/2021 |
| JP | 2001146523 A | 5/2001 |
| JP | 2002121288 A | 4/2002 |
| JP | 2005350530 A | 12/2005 |
| JP | 2006136657 A | 6/2006 |
| JP | 2007302776 A * | 11/2007 |
| WO | 9416000 A1 | 7/1994 |
| WO | 9600263 A1 | 1/1996 |
| WO | 9923161 A2 | 5/1999 |
| WO | 0194697 A2 | 12/2001 |
| WO | 0228969 A2 | 4/2002 |
| WO | 2009137058 A1 | 11/2009 |
| WO | 2010151798 A2 | 12/2010 |
| WO | 2011146484 A2 | 11/2011 |
| WO | 2014023319 A1 | 2/2014 |
| WO | 2015149029 A1 | 10/2015 |
| WO | 2016172039 A1 | 10/2016 |
| WO | 2017087265 A1 | 5/2017 |
| WO | 2017087658 A1 | 5/2017 |
| WO | 2018058193 A1 | 4/2018 |
| WO | WO-2019155398 A1 * | 8/2019 ............. C08L 67/02 |

OTHER PUBLICATIONS

Sudesh, Kumar, Synthesis of polyhydroxyalkanoate from palm oil and some new applications, Applications of Microbial Biotechnology, vol. 89, 2011, pp. 1373-1386.

Thibaut, Gerard, et al., PLA-PHA blends: morphology, thermal and mechanical properties, International Conference on Biodegradable and Biobased olymers—BIOPOL 2011, Aug. 2011, Strasbourg, France.

* cited by examiner

BIOBASED MATERIAL FOR CONSUMER GOODS PACKAGING

CROSS-REFERENCE TO RELATED APPLICATION

This application claims the benefit of the earlier filing date of U.S. provisional application 63/058,563, filed Jul. 30, 2020.

FIELD

This disclosure relates to biodegradable polymeric compositions. More particularly, this disclosure relates to a polymeric composition for the packaging of consumer goods which are biodegradable and/or compostable and more specifically home compostable.

BACKGROUND

Disposable materials are used in consumer goods consumption, storage, and packaging are commonly petroleum-based polymers such as polyethylene (PE), polypropylene (PP), or polyethylene terephthalate (PET). While these polymers may provide good strength, barrier, and/or printability characteristics, such polymers do not readily degrade or decompose after disposal—either in landfills or by home composting techniques. Thus, films, bags, and other materials made from such polymers may subsist in landfills for centuries after disposal.

It would be desirable to provide polymeric compositions suitable for consumer goods packaging which are biodegradable. In particular, it would be desirable to provide polymeric compositions for product packaging which are predominantly home compostable. Most preferably, the polymeric compositions would be completely home compostable.

These polymers can be used in several applications currently used to produce product packaging, including but not limited to, injection molding, compression molding, thermoforming, cast and blown film formation, extrusion coating, extrusion blow molding, injection stretch blow molding, and extrusion profiling.

SUMMARY OF THE INVENTION

In one aspect, the present disclosure provides a biodegradable polymeric composition. In one embodiment, this polymeric composition includes at least (1) from about 5 weight percent to about 95 weight percent poly(hydroxyalkanoates); (2) from about 5 weight percent to about 95 weight percent of at least one biodegradable polymer selected from the group consisting of poly(butylene succinate), poly(butylene succinate-co-adipate), poly(butylene adipate-co-terephthalate, poly(caprolactone), poly(lactic acid), cellulose esters (such as cellulose acetate) thermoplastic starch, and mixtures thereof; and (3) from about 0.1 weight percent to about 5 weight percent of a nucleating agent.

In certain embodiments, the polymeric composition preferably includes from about 35 weight percent to about 90 weight percent poly(hydroxyalkanoates). More preferably, the polymeric composition includes from about 40 weight percent to about 70 weight percent poly(hydroxyalkanoates)

In some embodiments, the polymeric composition preferably includes from about 5 weight percent to about 50 weight percent poly(butylene succinate). More preferably, the polymeric composition includes from about 10 weight percent to about 30 weight percent poly(butylene succinate).

According to some embodiments, the polymeric composition preferably includes from about 5 weight percent to about 50 weight percent poly(butylene succinate-co-adipate). More preferably, the polymeric composition includes from about 10 weight percent to about 30 weight percent poly(butylene succinate-co-adipate).

In some instances, the polymeric composition preferably includes from about 10 weight percent to about 70 weight percent poly(lactic acid). More preferably, the polymeric composition includes from about 20 weight percent to about 60 weight percent poly(lactic acid).

In certain embodiments, the polymeric composition preferably includes from about 5 weight percent to about 50 weight percent cellulose esters, such as cellulose acetate. More preferably, the polymeric composition includes from about 10 weight percent to about 30 weight percent cellulose esters.

In some embodiments, the poly(hydroxyalkanoates) in the composition are preferably made up of a mixture of a first copolymer and a second copolymer. The first copolymer includes from about 90 to about 99.9 mole percent monomer residues of 3-hydroxybutyrate and from about 0.1 to about 10 mole percent monomer residues of a second 3-hydoxyalkanoate having from 5 to 12 carbon atoms. The second copolymer includes at least 70 mole percent monomer residues of 3-hydroxybutyrate and monomer residues of the second 3-hydoxyalkanoate having from 5 to 12 carbon atoms in amount which at least 6 mole percent less than the amount of the second 3-hydoxyalkanoate in the first polymer.

According to certain embodiments, the nucleating agent is preferably selected from the group consisting of erythritols, pentaerythritol, dipentaerythritols, artificial sweeteners, stearates, polysaccharides, sorbitols, mannitols, inositols, polyester waxes, nanoclays, behenamide, erucamide, stearamide, oleamide, polyhydroxybutyrate, thymine, cyanuric acid, cytosine, adenine, uracil, guanine, boron nitride and mixtures thereof.

In some embodiments, the polymeric composition preferably also includes up to about 15 weight percent of a plasticizer. This plasticizer may be selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates) copolymers comprising at least 18 mole percent monomer residues of hydroxyalkanoates other than hydroxybutyrate, and mixtures thereof. More preferably, the polymeric composition includes from about 5 weight percent to about 15 weight percent of the plasticizer.

In certain instances, the polymeric composition preferably also includes up to about 50 weight percent of a filler. This filler may be selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof, and mixtures thereof. More preferably, the polymeric composition includes from about 5 weight percent to about 40 weight percent of the filler.

According to some embodiments, the polymeric composition preferably also includes up to about 20 weight percent of an impact modifier. This impact modifier may be selected from the group consisting of group consisting of acrylic-based resins and emulsions, isosorbide derivatives, natural rubbers, aliphatic polyesters, or mixtures thereof. More preferably, the polymeric composition includes from about 5 weight percent to about 15 weight percent of the impact modifier.

According to some embodiments, further additives may also be included in the polymeric composition. In some instances, the composition also includes up to 50 weight percent of one or more additives selected from the group consisting of poly(vinyl alcohols), poly(vinyl acetate), poly(vinyl laurate), poly(ethylene vinyl acetate), poly(glycolic acid), furandicarboxylic acid-based polyesters, cellulose, nanocellulose, glucans, and mixtures thereof.

In general, the poly(hydroxyalkanoates) of the polymeric composition may be either homopolymers or copolymers, including terpolymers. Thus, in certain embodiments, the poly(hydroxyalkanoates) are preferably a copolymer made up of from about 75 to about 99.9 mole percent monomer residues of 3-hydroxybutyrate and from about 0.1 to about 25 mole percent monomer residues of a second 3-hydoxyalkanoate having from 5 to 12 carbon atoms. In other embodiment, the poly(hydroxyalkanoates) are preferably a terpolymer made up from about 75 to about 99.9 mole percent monomer residues of 3-hydroxybutyrate and from about 0.1 to about 25 mole percent monomer residues of 3-hydroxyhexanoate, and from about 0.1 to about 25 mole percent monomer residues of a third 3-hydroxyalkanoate having from 5 to 12 carbon atoms.

In certain embodiments, the poly(hydroxyalkanoates) and the at least one biodegradable polymer are preferably reacted with each other in a transesterification.

In other embodiments, the poly(hydroxyalkanoates) and the at least one biodegradable polymer are preferably reacted with each other in a reactive extrusion process.

Further, in certain embodiments, the poly(hydroxyalkanoates) of the polymeric composition preferably have a weight average molecular weight from about 50,000 Daltons to about 7.5 million Daltons, and more preferably have a weight average molecular weight from about 300,000 Daltons to about 3.0 million Daltons.

In a further aspect, the present disclosure also provides a product package for a consumer goods product, wherein the product package includes at least one biodegradable package portion which comprises the aforementioned polymeric composition.

In certain embodiments, this at least biodegradable package portion is preferably formed a method selected from the group consisting of injection molding, compression molding, thermoforming, cast and blown film formation, extrusion coating, extrusion blow molding, injection stretch blow molding, and extrusion profiling.

DETAILED DESCRIPTION

In one aspect, the present disclosure provides a polymeric composition which is suitable for, among other things, packaging for consumer goods.

Preferably, the polymeric composition is biodegradable and/or compostable. More particularly the polymeric composition is both biodegradable and compostable.

As used herein, the term "biodegradable" refers to a plastic or polymeric material that will undergo biodegradation by living organisms (microbes) in anaerobic and aerobic environments (as determined by ASTM D5511), in soil environments (as determined by ASTM 5988), in freshwater environments (as determined by ASTM D5271 (EN 29408)), or in marine environments (as determined by ASTM D6691). The biodegradability of biodegradable plastics can also be determined using ASTM D6868 and European EN 13432.

The polymeric composition of the present disclosure is preferably also "compostable", as determined by ASTM D6400 for industrial or home compostability.

In particular, the biodegradable polymeric composition includes poly(hydroxyalkanoates) as a first biodegradable polymer. The composition is generally made up of from about 5 weight percent to about 95 weight percent poly(hydroxyalkanoates). More preferably, the composition is made up of from about 35 weight percent to about 90 weight percent poly(hydroxyalkanoates). Still more preferably, the polymeric composition includes from about 40 weight percent to about 70 weight percent poly(hydroxyalkanoates)

In some instances, the poly(hydroxyalkanoates) in the composition are preferably made up of a mixture of a first copolymer and a second copolymer. The first copolymer includes from about 90 to about 99.9 mole percent monomer residues of 3-hydroxybutyrate and from about 0.1 to about 10 mole percent monomer residues of a second 3-hydoxyalkanoate having from 5 to 12 carbon atoms. The second copolymer includes at least 70 mole percent monomer residues of 3-hydroxybutyrate and monomer residues of the second 3-hydoxyalkanoate having from 5 to 12 carbon atoms in amount which at least 6 mole percent less than the amount of the second 3-hydoxyalkanoate in the first polymer. It has surprisingly been found that, when the different in the mole percentages of the second 3-hydoxyalkanoate in the first copolymer and the second copolymer is at least 6 mole percent, then the first and second copolymers are no longer miscible with one another, but instead separate into different phases within the composition. This may be used advantageously alter the properties of the final composition.

In such instances, the inclusion of a relatively small amount of the second PHA copolymer improves the impact properties or toughness of the composition, providing articles with improved performance.

The polymeric composition also includes a second biodegradable polymer selected from the group consisting of poly(butylene succinate), poly(butylene succinate-co-adipate), poly(lactic acid), cellulose esters (such as cellulose acetate), thermoplastic starch, and mixtures thereof. The amount of this second biodegradable polymer is typically from about 5 weight percent to about 95 weight percent of the total composition.

In some embodiments, the second biodegradable polymer may include poly(butylene succinate) in an amount from about 5 weight percent to about 50 weight percent of the polymeric composition. More preferably, the polymeric composition includes from about 10 weight percent to about 30 weight percent poly(butylene succinate).

According to some embodiments, the second biodegradable polymer may include poly(butylene succinate)-co-butylene adipate in an amount from about 5 weight percent to about 50 weight percent of the polymeric composition. More preferably, the polymeric composition includes from about 10 weight percent to about 30 weight percent poly(butylene succinate)-co-butylene adipate.

In some instances, the second biodegradable polymer may include poly(lactic acid) in an amount from about 10 weight percent to about 70 weight percent of the polymeric composition. More preferably, the polymeric composition includes from about 20 weight percent to about 60 weight percent poly(lactic acid).

In certain embodiments, the second biodegradable polymer may include cellulose acetate or another cellulose ester in an amount from about 5 weight percent to about 50 weight percent of the polymeric composition. More preferably, the polymeric composition includes from about 10 weight percent to about 30 weight percent cellulose acetate or another cellulose ester.

In each of the various compositions discussed above, the polyhydroxyalkanoate polymer may be a homopolymer, made up only a single type of monomer residues. Generally, however, the polyhydroxyalkanoate polymer is a copolymer, made up of at least two different type of monomer residues. In some instances, the polyhydroxyalkanoate polymer may be a terpolymer, made up of at least three different type of monomer residues.

For instance, in some embodiments, the at least one polyhydroxyalkanoate polymer is preferably a copolymer made up of from about 75 to about 99.9 mole percent monomer residues of 3-hydroxybutyrate and from about 0.1 to about 25 mole percent monomer residues of a second 3-hydoxyalkanoate having from 5 to 12 carbon atoms.

In other embodiments, the at least one polyhydroxyalkanoate polymer is preferably a terpolymer made up from about 75 to about 99.9 mole percent monomer residues of 3-hydroxybutyrate and from about 0.1 to about 25 mole percent monomer residues of 3-hydroxyhexanoate, and from about 0.1 to about 25 mole percent monomer residues of a third 3-hydoxyalkanoate having from 5 to 12 carbon atoms.

In general, the at least one polyhydroxyalkanoate polymer has a weight average molecular weight from about 50,000 Daltons to about 7.5 million Daltons, and more preferably has a weight average molecular weight from about 300,000 Daltons to about 3.0 million Daltons.

In certain embodiments, the poly(hydroxyalkanoates) and the at least one biodegradable polymer are preferably reacted with each other in a transesterification. In such instances, a small amount of a catalyst (such as tin ethylhexanoate) may optionally be incorporated into the composition so as to facilitate the transesterification reaction. Transesterification of the poly(hydroxyalkanoates) and the at least one biodegradable polymer leads to for example, branched structures that provide for better processability with less energy consumption. Transesterification can also provide for improved physical properties, as the transesterified polymers can act as interfacial agents and improve the compatibility of other polymer molecules in the composition that may not have completely reacted.

Most commonly, the aforementioned transesterification reaction is carried out by reacting the poly(hydroxyalkanoates) and the at least one biodegradable polymer with each other in a reactive extrusion process.

A nucleating agent is also typically present in the polymeric composition in an amount from about from about 0.1 weight percent to about 5 weight percent. In certain embodiments, the core layer nucleating agent is preferably selected from the group consisting of erythritols, pentaerythritol, dipentaerythritols, artificial sweeteners, stearates, polysaccharides, sorbitols, mannitols, inositols, polyester waxes, nanoclays, behenamide, erucamide, stearamide, oleamide, polyhydroxybutyrate, thymine, cyanuric acid, cytosine, adenine, uracil, guanine, boron nitride and mixtures thereof.

The polymeric composition may also include an optional plasticizer material as well. Suitable materials for the plasticizer are typically selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates) copolymers comprising at least 18 mole percent monomer residues of hydroxyalkanoates other than hydroxybutyrate, and mixtures thereof.

The amount of plasticizer in polymeric composition may be up to about 15 weight percent. More preferably, the polymeric composition is made up of from about 5 weight percent to about 15 weight percent of the plasticizer.

Optionally, the polymeric composition may also include a filler material. Suitable materials for the filler are typically selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof, and mixtures thereof.

The amount of filler in the polymeric composition may be up to about 50 weight percent. More preferably, the core layer polymeric composition is made up of from about 5 weight percent to about 40 weight percent of the filler.

Further, the polymeric composition may also include up to 20 weight percent of an impact modifier. More preferably, the polymeric composition includes from about 5 weight percent to about 15 weight percent of the impact modifier. Suitable impact modifiers for the polymeric compositions are preferably selected from the group consisting of acrylic-based resins and emulsions, isosorbide derivatives, natural rubbers, aliphatic polyesters, or mixtures thereof.

Moreover, in some instances, the polymeric composition may include up to 50 weight percent of one or more additives selected from the group consisting of poly(vinyl alcohols), poly(vinyl acetate), poly(vinyl laurate), poly(ethylene vinyl acetate), poly(glycolic acid), furandicarboxylic acid-based polyesters, cellulose, nanocellulose, glucans, and mixtures thereof.

In each of the various polymeric compositions discussed above, the polyhydroxyalkanoate polymer may be a homopolymer, made up only a single type of monomer residues. Generally, however, the polyhydroxyalkanoate polymer is a copolymer, made up of at least two different type of monomer residues. In some instances, the polyhydroxyalkanoate polymer may be a terpolymer, made up of at least three different type of monomer residues.

For instance, in some embodiments, the at least one polyhydroxyalkanoate polymer is preferably a copolymer made up of from about 75 to about 99.9 mole percent monomer residues of 3-hydroxybutyrate and from about 0.1 to about 25 mole percent monomer residues of a second 3-hydoxyalkanoate having from 5 to 12 carbon atoms.

In other embodiments, the at least one polyhydroxyalkanoate polymer is preferably a terpolymer made up from about 75 to about 99.9 mole percent monomer residues of 3-hydroxybutyrate and from about 0.1 to about 25 mole percent monomer residues of 3-hydroxyhexanoate, and from about 0.1 to about 25 mole percent monomer residues of a third 3-hydoxyalkanoate having from 5 to 12 carbon atoms.

In general, the at least one polyhydroxyalkanoate polymer has a weight average molecular weight from about 50,000 Daltons to about 7.5 million Daltons, and more preferably has a weight average molecular weight from about 300,000 Daltons to about 3.0 million Daltons.

In a further aspect, the present disclosure also provides a product package for a consumer goods product, which makes use of the aforementioned polymeric composition. Specifically, the product package includes at least one biodegradable package portion which comprises the aforementioned polymeric composition. the product package may be used for the packaging of clothing, household goods, foods, and health and beauty products.

In certain embodiments, this biodegradable package portion may be formed by a method selected from the group consisting of injection molding, compression molding, thermoforming, cast and blown film formation, extrusion coating, extrusion blow molding, injection stretch blow molding, and extrusion profiling.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A biodegradable polymeric composition comprising: (1) from about 5 weight percent to about 95 weight percent poly(hydroxyalkanoates); (2) from about 5 weight percent to about 95 weight percent of at least one biodegradable polymer selected from the group consisting of poly(butylene succinate), poly(butylene succinate-co-adipate), poly(butylene adipate-co-terephthalate), poly(caprolactone), poly(lactic acid), cellulose esters, thermoplastic starch, and mixtures thereof; and (3) from about 0.1 weight percent to about 5 weight percent of a nucleating agent,
   wherein the poly(hydroxyalkanoates) comprise a mixture of a first copolymer and a second copolymer,
   wherein the first copolymer consists of from about 90 to about 99.9 mole percent monomer residues of 3-hydroxybutyrate and from about 0.1 to about 10 mole percent monomer residues of a second 3-hydroxyalkanoate having from 5 to 12 carbon atoms,
   wherein the second copolymer consists of at least 70 mole percent monomer residues of 3-hydroxybutyrate and monomer residues of the second 3-hydroxyalkanoate having from 5 to 12 carbon atoms in an amount which is at least 6 mole percent less than the amount of the second 3-hydroxyalkanoate in the first polymer, and
   wherein the poly(hydroxyalkanoates) and the at least one biodegradable polymer are transesterified with one another.

2. The polymeric composition of claim 1, wherein the composition comprises from about 35 weight percent to about 90 weight percent poly(hydroxyalkanoates).

3. The polymeric composition of claim 1, wherein the composition comprises from about 30 weight percent to about 90 weight percent poly(butylene succinate).

4. The polymeric composition of claim 1, wherein the composition comprises from about 30 weight percent to about 90 weight percent poly(butylene succinate-co-adipate).

5. The polymeric composition of claim 1, wherein the composition comprises from about 10 weight percent to about 70 weight percent poly(lactic acid).

6. The polymeric composition of claim 1, wherein the composition comprises from about 30 weight percent to about 90 weight percent cellulose esters.

7. The polymeric composition of claim 1, wherein the nucleating agent is selected from the group consisting of erythritols, pentaerythritol, dipentaerythritols, artificial sweeteners, stearates, polysaccharides, sorbitols, mannitols, inositols, polyester waxes, nanoclays, behenamide, erucamide, stearamide, oleamide, poly(hydroxybutyrate), thymine, cyanuric acid, cytosine, adenine, uracil, guanine, boron nitride and mixtures thereof.

8. The polymeric composition of claim 1, wherein the composition further comprises up to about 15 weight percent of a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates) copolymers comprising at least 18 mole percent monomer residues of hydroxyalkanoates other than hydroxybutyrate, and mixtures thereof.

9. The polymeric composition of claim 8, wherein the composition comprises from about 5 weight percent to about 15 weight percent of the plasticizer.

10. The polymeric composition of claim 1, wherein the composition further comprises up to about 50 weight percent of a filler selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof.

11. The polymeric composition of claim 10, wherein the composition comprises from about 5 weight percent to about 40 weight percent of the filler.

12. The polymeric composition of claim 1, wherein the composition further comprises up to about 20 weight percent of an impact modifier selected from the group consisting of acrylic-based resins and emulsions, isosorbide derivatives, natural rubbers, aliphatic polyesters, or mixtures thereof.

13. The polymeric composition of claim 12, wherein the composition comprises from about 5 weight percent to about 15 weight percent of the impact modifier.

14. The polymeric composition of claim 1, wherein the composition further comprises up to 50 weight percent of one or more additives selected from the group consisting of poly(vinyl alcohols), poly(vinyl acetate), poly(vinyl laurate), poly(ethylene vinyl acetate), poly(glycolic acid), furandicarboxylic acid-based polyesters, cellulose, nanocellulose, glucans, and mixtures thereof.

15. The polymeric composition of claim 1, wherein the poly(hydroxyalkanoates) have a weight average molecular weight from about 50,000 Daltons to about 7.5 million Daltons.

16. The polymeric composition of claim 1, wherein the poly(hydroxyalkanoates) and the at least one biodegradable polymer are reactively extruded with one another.

17. A product package for a consumer goods product, wherein the product package comprises at least one biodegradable package portion which comprises the polymeric composition of claim 1.

18. The product package of claim 17, wherein the at least biodegradable package portion is formed by a method selected from the group consisting of injection molding, compression molding, thermoforming, cast and blown film formation, extrusion coating, extrusion blow molding, injection stretch blow molding, and extrusion profiling.

* * * * *